(12) United States Patent
Winter (10) Patent No.: US 7,929,565 B2
(45) Date of Patent: Apr. 19, 2011

(54) ETHERNET SWITCHING OF PCI EXPRESS PACKETS

(75) Inventor: Robert Winter, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 522 days.

(21) Appl. No.: 11/954,343

(22) Filed: Dec. 12, 2007

(65) Prior Publication Data

US 2009/0154469 A1 Jun. 18, 2009

(51) Int. Cl.
*H04J 3/16* (2006.01)
(52) U.S. Cl. ......... 370/466; 370/252; 370/401; 709/236
(58) Field of Classification Search .................. 370/230, 370/235, 241, 252, 254, 223, 396, 398, 352, 370/351, 395.53, 392, 3, 95.5, 412, 466, 370/403, 401, 389, 419; 710/311, 22, 240, 710/112, 315, 114, 31, 313, 314, 106, 308, 710/306; 709/232, 236, 213, 234, 238
See application file for complete search history.

(56) References Cited

U.S. PATENT DOCUMENTS

| | | | |
|---|---|---|---|
| 7,174,412 B2 | 2/2007 | Lin | |
| 7,185,213 B2 | 2/2007 | Hsu | |
| 7,215,911 B2 | 5/2007 | Kim et al. | |
| 7,293,129 B2 * | 11/2007 | Johnsen et al. | 710/313 |
| 7,480,303 B1 * | 1/2009 | Ngai | 370/395.5 |
| 2004/0210623 A1 * | 10/2004 | Hydrie et al. | 709/201 |
| 2004/0221298 A1 * | 11/2004 | Cedola | 719/321 |
| 2005/0138171 A1 * | 6/2005 | Slaight | 709/225 |
| 2006/0206655 A1 * | 9/2006 | Chappell et al. | 710/315 |
| 2007/0237082 A1 * | 10/2007 | Han | 370/235 |
| 2008/0091857 A1 * | 4/2008 | McDaniel | 710/72 |
| 2008/0117909 A1 * | 5/2008 | Johnson | 370/392 |
| 2008/0163207 A1 * | 7/2008 | Reumann et al. | 718/1 |
| 2008/0163236 A1 * | 7/2008 | Arndt et al. | 718/104 |
| 2008/0195747 A1 * | 8/2008 | Elmaliah | 709/232 |
| 2008/0288661 A1 * | 11/2008 | Galles | 710/3 |
| 2008/0320181 A1 * | 12/2008 | Lauterbach et al. | 710/38 |
| 2009/0006710 A1 * | 1/2009 | Daniel et al. | 710/315 |
| 2009/0094399 A1 * | 4/2009 | Daniel et al. | 710/311 |
| 2009/0094401 A1 * | 4/2009 | Larson et al. | 710/316 |
| 2009/0150547 A1 * | 6/2009 | Tripathi | 709/226 |
| 2009/0150883 A1 * | 6/2009 | Tripathi et al. | 718/1 |

* cited by examiner

*Primary Examiner* — Aung S Moe
*Assistant Examiner* — Abdullah Riyami
(74) *Attorney, Agent, or Firm* — Hamilton & Terrile LLP; Stephen A. Terrile (57) ABSTRACT

A method for emulating Peripheral Component Interconnect Express (PCIe) behavior over an Ethernet switching fabric which includes encapsulating a PCIe packet within an Ethernet packet to provide an Ethernet encapsulated PCIe packet, and routing the Ethernet encapsulated PCIe packet within the Ethernet switching fabric via information included within the Ethernet packet.

9 Claims, 6 Drawing Sheets

ETHERNET SWITCHING OF PCI EXPRESS PACKETS

BACKGROUND OF THE INVENTION

1. Field of the Invention

The present invention relates to information handling systems and more particularly to Ethernet switching of PCI Express Packets.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems which conform to a Peripheral Component Interconnect (PCI) Express (PCIe) architecture. The PCIe architecture is a high-speed, serial, frame-based interconnect architecture. It is known to provide a PCIe information handling system with virtualization functionality. Virtualization provides a technique for hiding physical characteristics of computing resources from the way in which other systems, applications, or end users interact with those resources. The PCIe specification defines a plurality of virtualization constructs. These virtualization constructs include Single Root I/O Virtualization (SR-IOV) and Multi Root I/O Virtualization (MR-IOV). The PCIe specification also defines a switching architecture to provide virtualization support with system architectures that interconnect multiple PCIe root complexes to PCIe input/output (I/O) adapters. This virtualization support is accomplished using a frame-based PCIe protocol.

There are a number of issues relating to PCIe switching. These issues include scalability, maturity and a relatively limited number of vendors implementing these devices. Additionally, the PCIe architecture is also a local switching architecture that is unable to scale or reach beyond localized servers. Thus the PCIe architecture is not well suited to a blade system type environment.

It is also known to provide large scale information handling systems, such as blade type systems which conform to an Ethernet architecture. Ethernet is a family of frame-based computer networking technologies for local area networks (LANs). The Ethernet architecture defines wiring and signaling standards for a physical layer, through means of network access at the Media Access Control (MAC) and Data Link Layer (DDL), as well as a common addressing format. Ethernet switching is a mature architecture and a very large vendor ecosystem supports the architecture.

It would be desirable to provide a system and method to encapsulate PCIe packets within Ethernet packets and thus emulate PCIe behavior over the Ethernet switching fabric.

SUMMARY OF THE INVENTION

In accordance with the present invention a system and method are provided which encapsulate PCIe packets within Ethernet packets and thus emulate PCIe behavior over the Ethernet switching fabric.

More specifically, in one embodiment, the invention relates to a method for emulating Peripheral Component Interconnect Express (PCIe) behavior over an Ethernet switching fabric which includes encapsulating a PCIe packet within an Ethernet packet to provide an Ethernet encapsulated PCIe packet, and routing the Ethernet encapsulated PCIe packet within the Ethernet switching fabric via information included within the Ethernet packet.

In another embodiment, the invention relates to an apparatus for emulating Peripheral Component Interconnect Express (PCIe) behavior over an Ethernet switching fabric which includes means for encapsulating a PCIe packet within an Ethernet packet to provide an Ethernet encapsulated PCIe packet, and means for routing the Ethernet encapsulated PCIe packet within the Ethernet switching fabric via information included within the Ethernet packet.

In another embodiment, the invention relates to an information handling system which includes a processor and memory coupled to the processor. The memory stores a system for emulating Peripheral Component Interconnect Express (PCIe) behavior over an Ethernet switching fabric. The system for emulating Peripheral Component Interconnect Express (PCIe) behavior over an Ethernet switching fabric includes instructions executable by the processor for encapsulating a PCIe packet within an Ethernet packet to provide an Ethernet encapsulated PCIe packet, and routing the Ethernet encapsulated PCIe packet within the Ethernet switching fabric via information included within the Ethernet packet.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
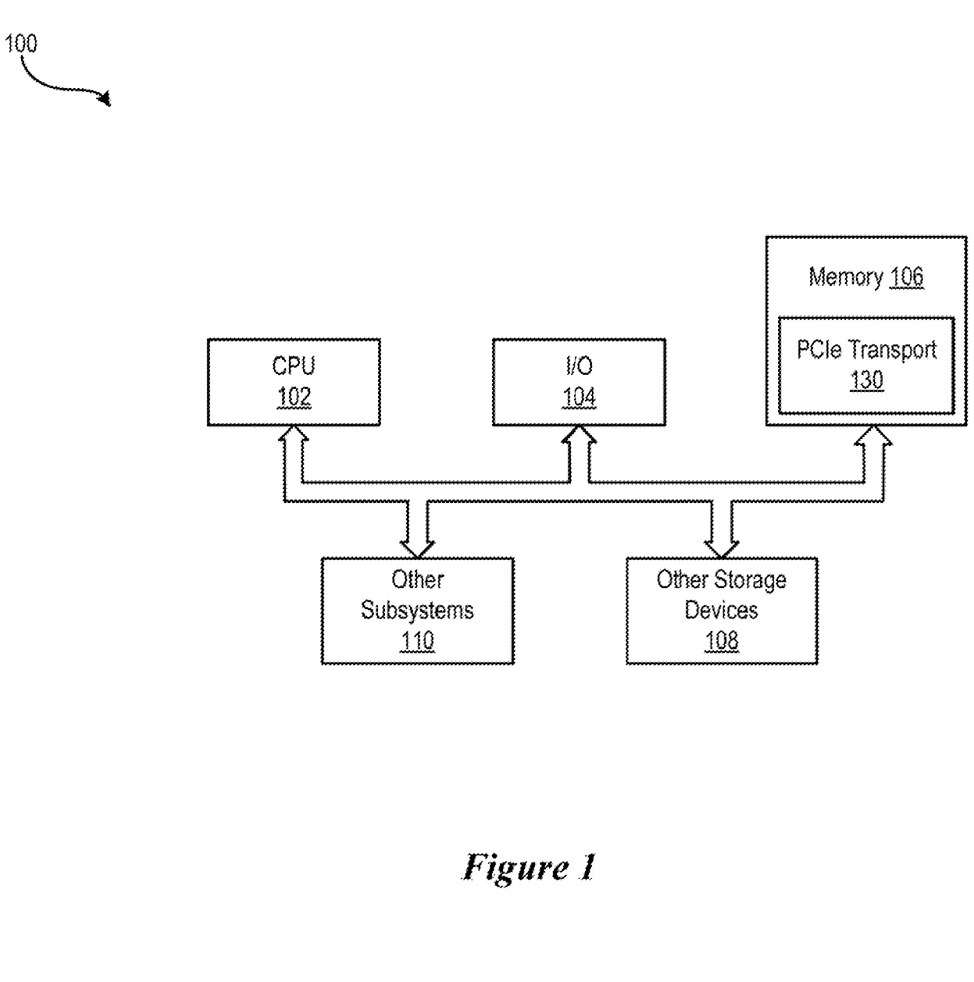
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a basic input output system 128 as well as a PCIe transport module 130.

The a PCIe transport system 130 enables the information handling system 100 to transport PCIe packets over an Ethernet switching fabric thereby emulating the facilities provided by a PCIe switching infrastructure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
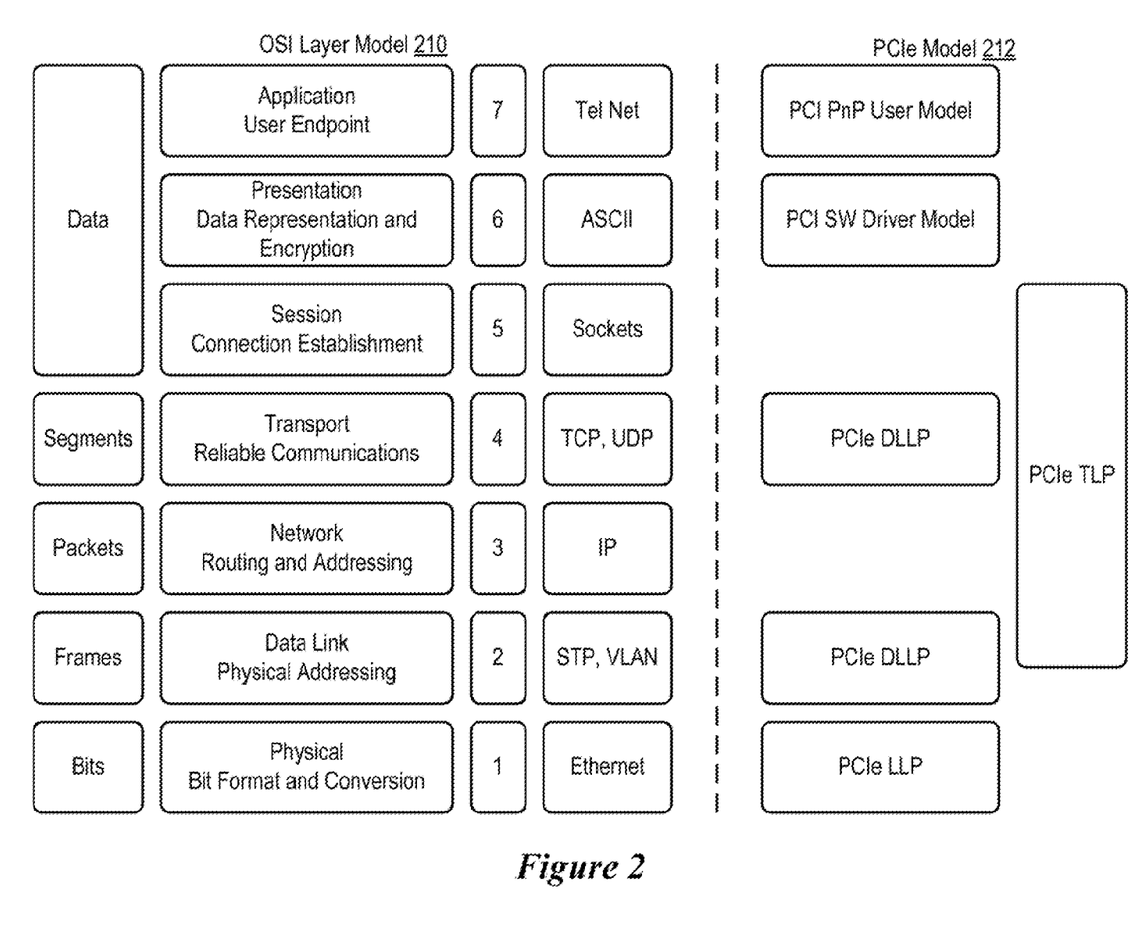
FIG. 2 shows a block diagram of an Open Systems Interconnection layer model and PCIe protocol.
Figure 3:
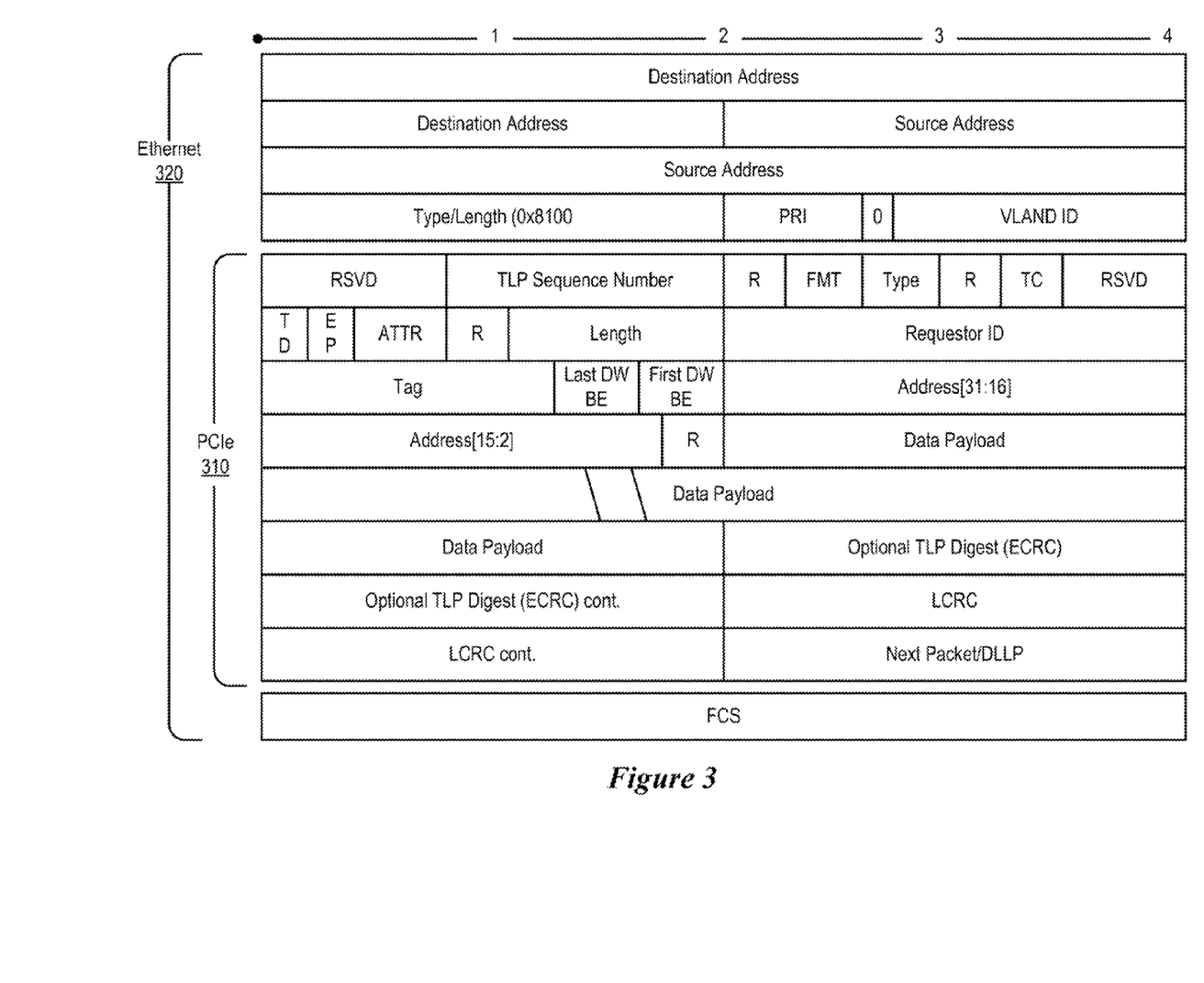
FIG. 3 shows a block diagram of an encapsulation of a PCIe TLD/DLLP PDUs in an Ethernel Layer 2 frame.

FIG. 2 shows a block diagram of an interrelation 210 (or lack thereof) between an Open Systems Interconnection (OSI) layer model 210 and PCIe protocol 212 is shown. FIG. 3 shows a block diagram of an encapsulation of a PCIe TLD/DLLP protocol data unit (PDU) 310 within an Ethernet frame 320 such as an Ethernet Layer 2 frame.

The PCIe protocol model 212 does not precisely correspond to the OSI layer model 210. More specifically, the PCIe Transport Layer Protocol (TLP) and the PCIe Data Link-Layer Protocol (DLLP) being mutually aware of each other and not strictly layered with regard to responsibilities presents a challenge when encapsulating the PCIe protocol.

Figure 4:
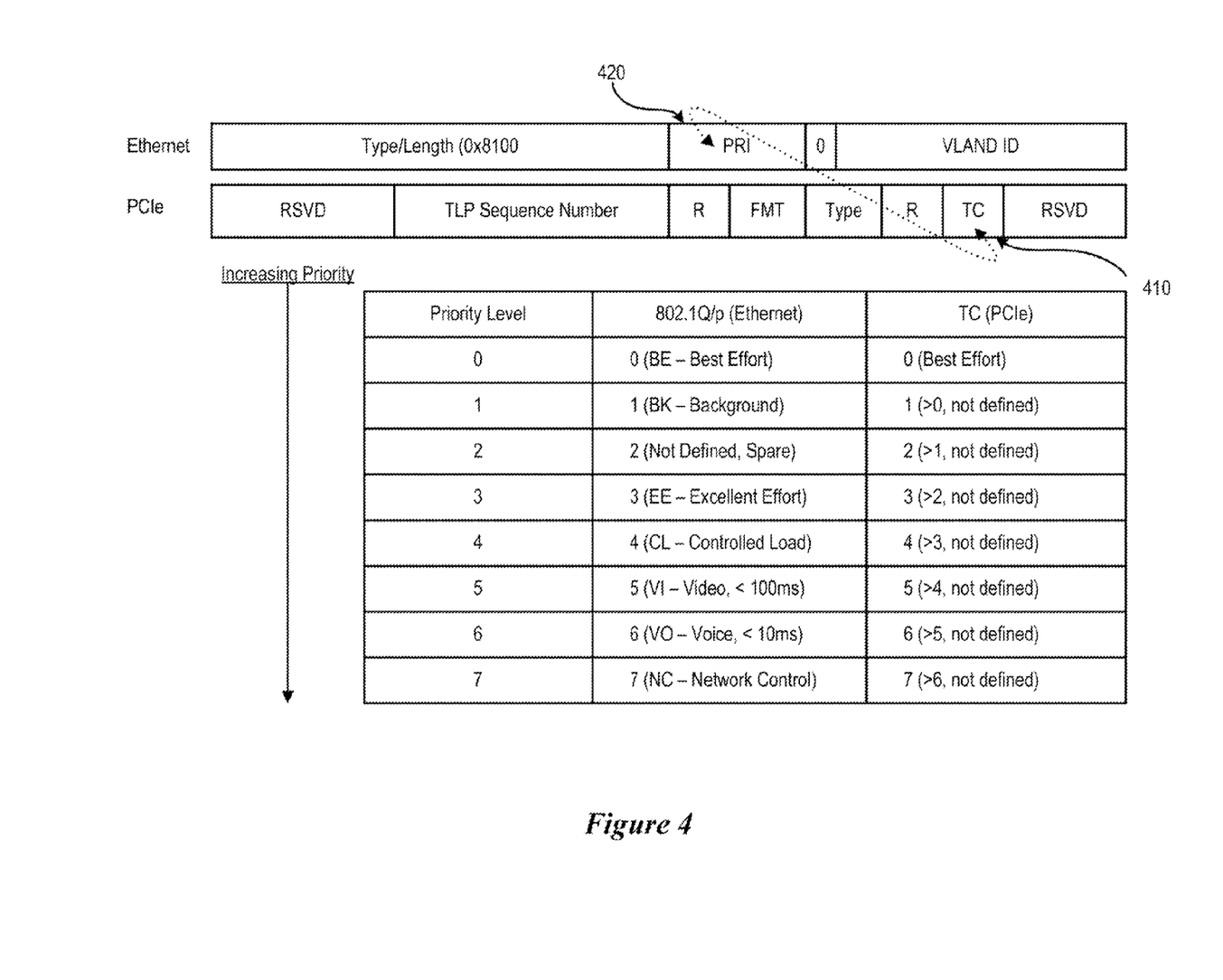
FIG. 4 shows a block diagram of mapping of user priorities to PCIe TCs.

Referring to FIG. 4, a block diagram of mapping of user priorities to PCIe traffic classes (TCs) is shown. There are facilities defined within the PCIe protocol to support Quality of Service (QoS) and virtual pathways. These facilities are referred to as Traffic Class (TC) facilities 410 and Virtual Channel (VC) facilities, respectively.

PCIe packets are routed either by address or by device/bus/function identifier. To move PCIe packets through a non-PCIe switching fabric, the transport system 130 should emulate the TC facilities, the VC facilities and the routing methods inherent in the PCIe definition. While the transport system 130 does not necessarily achieve exact correspondence, the system 130 should not adversely affect the expected behavior of the switching infrastructure.

Thus, to enable Ethernet as an underlying fabric for PCIe packet transport the transport system 130 maps TC and VC behavior and translates Ethernet MAC forwarding techniques to PCIe routing techniques. More specifically, the PCIe architecture defines eight levels of differentiated TC service with TC0 being a best effort and TC1-TC7 offering differentiated service levels. Additionally, Ethernet, such as Ethernet 802.1Q (802.1p historical sections), defines eight user priority levels. Accordingly, to enable Ethernet as an underlying fabric for a PCIe packet, the transport system 130 maps the TC levels of the PCIe architecture to the Ethernet user priority levels.

Figure 5:
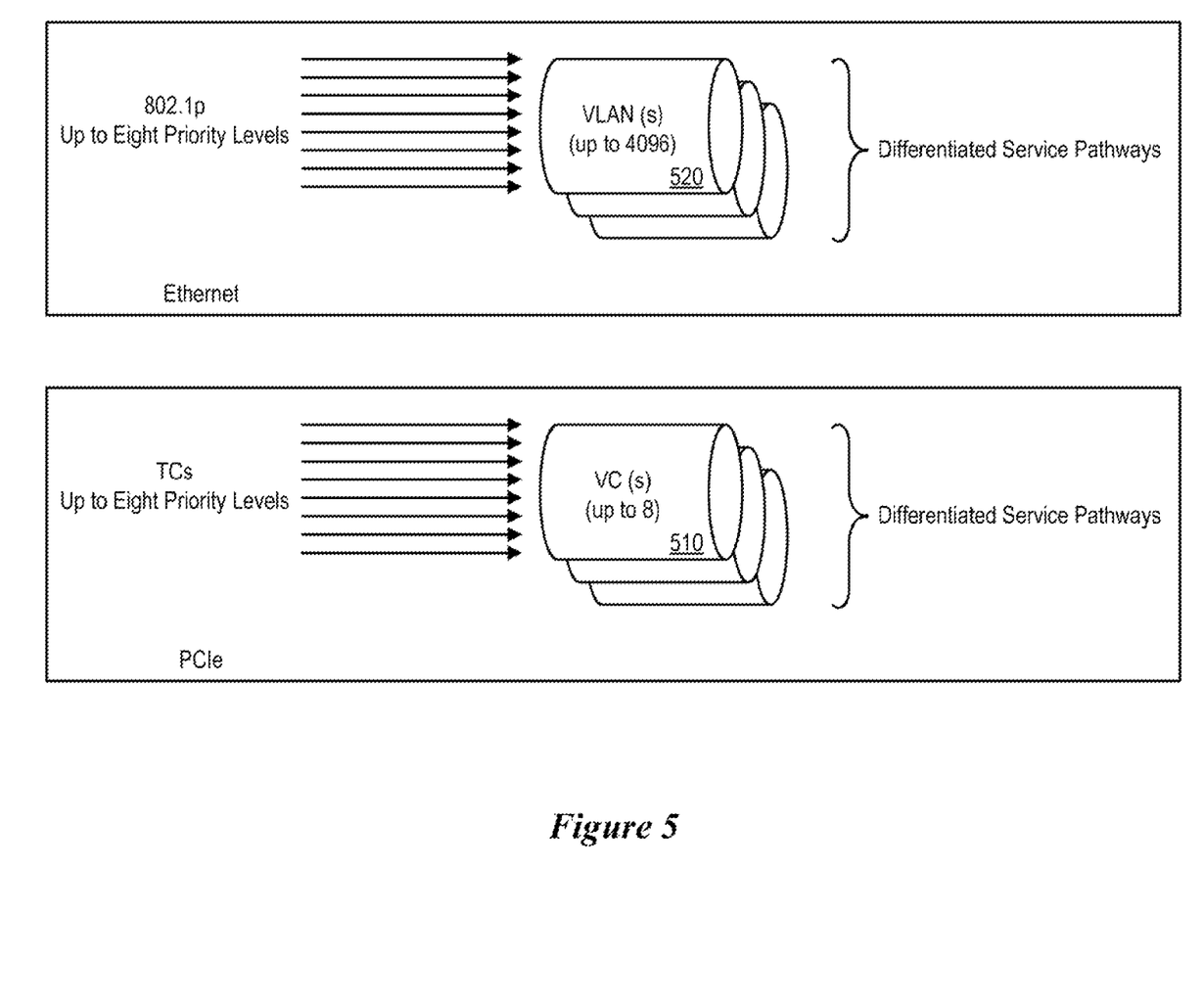
FIG. 5 shows a block diagram of mapping of VLANs to VCs.

Referring to FIG. 5, a block diagram of mapping of virtual local area networks (VLANs) to VCs is shown. More specifically, PCIe VCs 510 are artifacts that support a TC differentiated service facility. Each VC can have one or more TCs mapped to it. Thus, VCs provide an internal arbitrated buffering scheme that implement the TC capability by the placement of packets with different TC values into the appropriate VC buffers. There can be up to eight VCs in a PCIe infrastructure. VCs closely resemble Ethernet VLANs 520, particularly VLANs that are priority based. VLANs, unlike VCs, are steered directly through the Ethernet switching fabric. Buffers in an Ethernet switch support the 802.1Q/p priority levels directly. VCs can thus be mapped to VLANs via the transport system 130.

Figure 6:
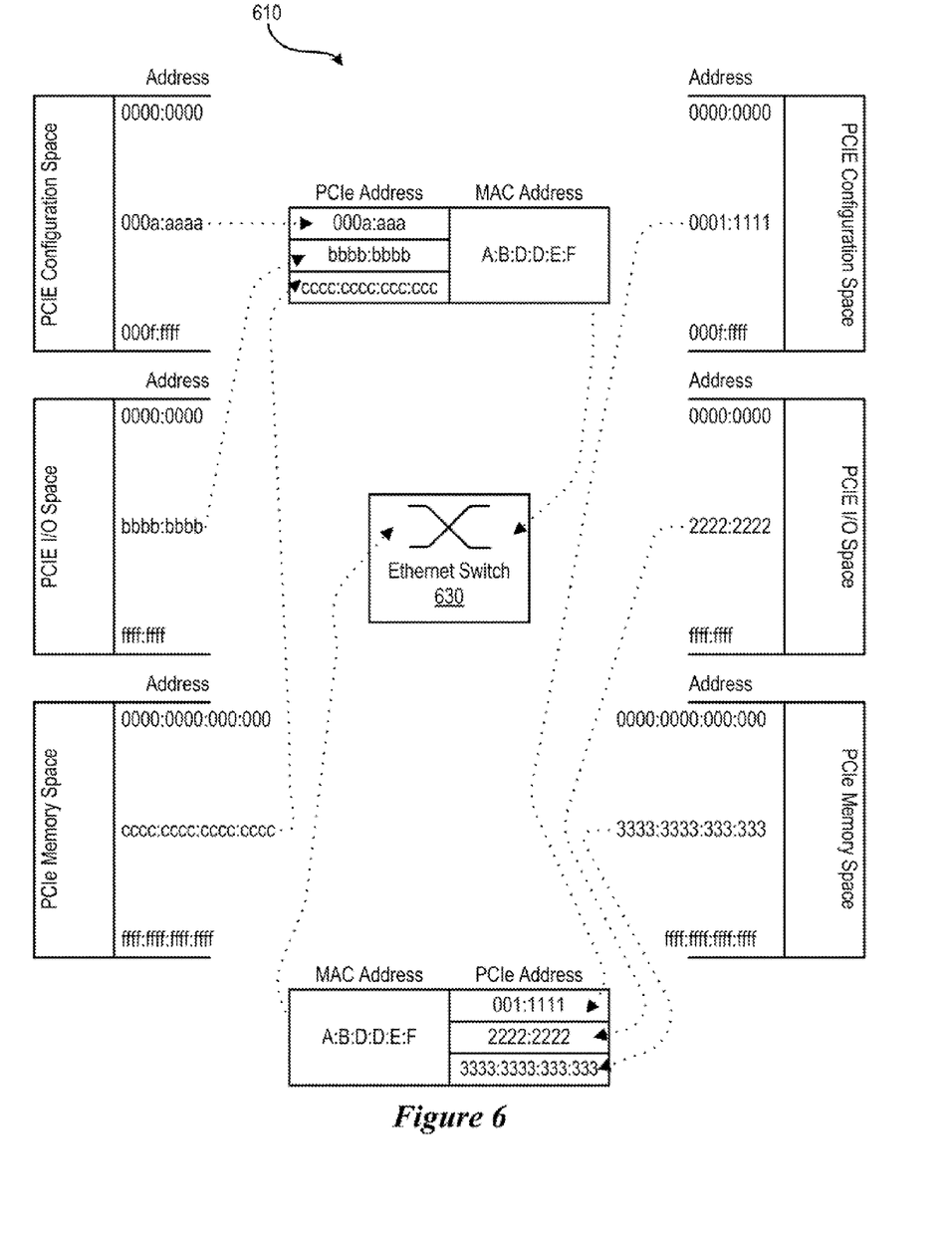
FIG. 6 shows a block diagram of PCIe address to Ethernet MAC translation.

Referring to FIG. 6, a block diagram of PCIe address to Ethernet MAC translation is shown. To route PCIe packets the transport system 130 associates MAC addresses with the PCIe address ranges supported by specific adapters. This is accomplished via a translation table 610.

While the re-transmit facility of the PCIe DLLP layer is not possible using only Ethernet Layer 2 protocols, the corruption of an Ethernet Layer 2 packet is a rare event and can be handled by the upper layers of the Ethernet such as the Transmission Control Protocol (TCP). Additionally, the possibility of out-of-order packets is substantially eliminated within PCIe transport system 130 by using sequence numbers. While this function is not available within an Ethernet Layer 2 switch 630, this function can be provided by the IP (Internet Protocol) layer. These events arc rare, especially in an internal fabric with dedicated lanes.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for emulating Peripheral Component Interconnect Express (PCIe) behavior over an Ethernet switching fabric comprising:
   encapsulating a PCIe packet within an Ethernet packet to provide an Ethernet encapsulated PCIe packet; and,
   routing the Ethernet encapsulated PCIe packet within the Ethernet switching fabric via information included within the Ethernet packet; and wherein the PCIe packet conforms to a PCIe architecture and the Ethernet packet conforms to an Ethernet architecture;
   the PCIe architecture comprises a plurality of virtual channels; the Ethernet architecture comprises a plurality of virtual local area networks; and,
   the encapsulating further comprises mapping the plurality of virtual channels to the plurality of virtual local area networks;
   wherein the PCIe packet comprises traffic class facilities; and, the encapsulating further comprises emulating the traffic class facilities within the Ethernet encapsulated PCIe packet;
   wherein the emulating further comprises: mapping the PCIe traffic class facilities to Ethernet user priority levels;
   wherein each of the plurality of virtual channels comprises one or more traffic classes; and, the plurality of virtual channels provide an internal arbitrated buffering scheme to implement traffic class capability.

2. The method of claim 1 wherein:
   the PCIe packet conforms to a PCIe architecture and the Ethernet packet conforms to an Ethernet architecture;
   the PCIe architecture comprises a plurality of PCIe address ranges, each of the plurality of PCIe address ranges corresponding to specific PCIe adapters;
   the Ethernet architecture comprises a plurality of media access controller (MAC) address ranges; and, the routing further comprises
   associating MAC address ranges with PCIe address ranges.

3. The method of claim 2 wherein the associating further comprises:
   providing an association translation table; and,
   associating the MAC address ranges with the PCIe address ranges via the association translation table.

4. An apparatus for emulating Peripheral Component Interconnect Express (PCIe) behavior over an Ethernet switching fabric comprising:
   means for encapsulating a PCIe packet within an Ethernet packet to provide an Ethernet encapsulated PCIe packet; and,
   means for routing the Ethernet encapsulated PCIe packet within the Ethernet switching fabric via information included within the Ethernet packet, and wherein the PCIe packet conforms to a PCIe architecture and the Ethernet packet conforms to an Ethernet architecture;
   the PCIe architecture comprises a plurality of virtual channels; the Ethernet architecture comprises a plurality of virtual local area networks; and, the means for encapsulating further comprises means for mapping the plurality of virtual channels to the plurality of virtual local area networks; the PCIe packet comprises traffic class facilities; and, the means for encapsulating further comprises means for emulating the traffic class facilities within the Ethernet encapsulated PCIe packet;
   wherein the means for emulating further comprises: means for mapping the PCIe traffic class facilities to Ethernet user priority levels;
   wherein each of the plurality of virtual channels comprises one or more traffic classes; and, the plurality of virtual channels provide an internal arbitrated buffering scheme to implement traffic class capability.

5. The apparatus of claim 4 wherein:
   the PCIe packet conforms to a PCIe architecture and the Ethernet packet conforms to an Ethernet architecture;
   the PCIe architecture comprises a plurality of PCIe address ranges, each of the plurality of PCIe address ranges corresponding to specific PCIe adapters;
   the Ethernet architecture comprises a plurality of media access controller (MAC) address ranges; and, the means for routing further comprises
   means for associating MAC address ranges with PCIe address ranges.

6. The apparatus of claim 5 wherein the means for associating further comprises:
   an association translation table; and,
   means for associating the MAC address ranges with the PCIe address ranges via the association translation table.

7. An information handling system comprising: a processor; memory coupled to the processor, the memory storing a system for emulating Peripheral Component Interconnect Express (PCIe) behavior over an Ethernet switching fabric, the system for emulating Peripheral Component Interconnect Express (PCIe) behavior over an Ethernet switching fabric comprising instructions executable by the processor for:
   encapsulating a PCIe packet within an Ethernet packet to provide an Ethernet encapsulated PCIe packet; and, routing the Ethernet encapsulated PCIe packet within the Ethernet switching fabric via information included within the Ethernet packet; and wherein the PCIe packet conforms to a PCIe architecture and the Ethernet packet conforms to an Ethernet architecture; the PCIe architecture comprises a plurality of virtual channels;
   the Ethernet architecture comprises a plurality of virtual local area networks; and, the encapsulating further comprises mapping the plurality of virtual channels to the plurality of virtual local area networks;
   wherein the PCIe packet comprises traffic class facilities; and, the instructions for encapsulating further comprise instructions for emulating the traffic class facilities within the Ethernet encapsulated PCIe packet;
   wherein the instructions for emulating further comprise: instructions for mapping the PCIe traffic class facilities to Ethernet user priority levels;
   wherein each of the plurality of virtual channels comprises one or more traffic classes; and, the plurality of virtual channels provide an internal arbitrated buffering scheme to implement traffic class capability.

8. The information handling system of claim 7 wherein:
   the PCIe packet conforms to a PCIe architecture and the Ethernet packet conforms to an Ethernet architecture;
   the PCIe architecture comprises a plurality of PCIe address ranges, each of the plurality of PCIe address ranges corresponding to specific PCIe adapters;
   the Ethernet architecture comprises a plurality of media access controller (MAC) address ranges; and, the instructions for routing further comprise
   instructions for associating MAC address ranges with PCIe address ranges.

9. The information handling system of claim 8 further comprising:

an association translation table; and, wherein the instructions for associating further comprise:

means for associating the MAC address ranges with the PCIe address ranges via the association translation table.

* * * * *